Sept. 10, 1968  J. B. McKEOWN  3,400,822
EXTENDED AERATION SEWAGE TREATMENT PLANTS
Filed Sept. 7, 1966
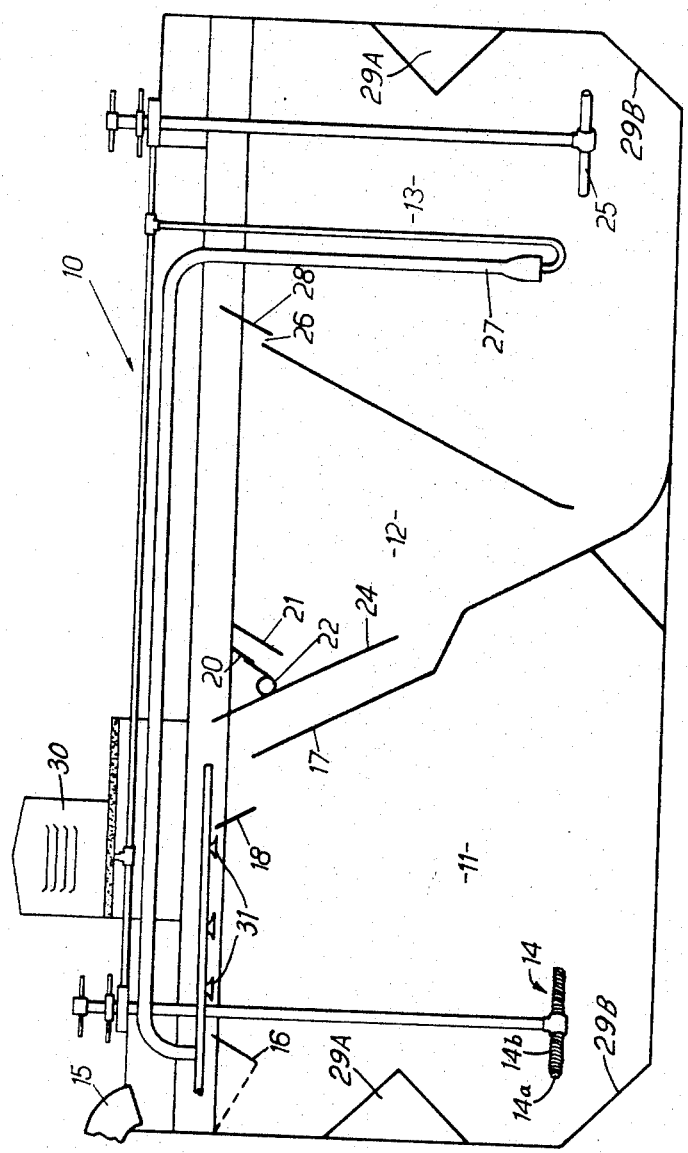
Inventor
JOHN BELL McKEOWN
By McGlew and Toren
Attorneys

United States Patent Office 3,400,822
Patented Sept. 10, 1968

3,400,822
EXTENDED AERATION SEWAGE
TREATMENT PLANTS
John Bell McKeown, Hamilton, Scotland, assignor to Macleod & Miller Engineers Limited, a British company
Filed Sept. 7, 1966, Ser. No. 578,113
4 Claims. (Cl. 210—195)

ABSTRACT OF THE DISCLOSURE

An extended aeration activated sludge sewage treatment plant comprised of a primary aeration compartment, a settling compartment in communication with the primary compartment at its upper end and in communication with a secondary aeration compartment at its lower end. Diffusion means are disposed in both of the aeration compartments for circulating liquid therein. Raw effluent is introduced into the primary aeration compartment and liquid and effluent flows therefrom into the settling compartment where liquid may be removed from the upper end and sludge may be removed from the lower end. The diffusion means imparts a whirling flow path to the liquid in the secondary aeration compartment. The whirling liquid circulating past the passageway communicating between the secondary compartment and the settling compartment withdraws sludge from the lower end of the settling compartment into the secondary compartment. An air lift pump located in the secondary compartment circulates liquid and sludge to the primary compartment.

Summary of the invention

This invention relates to extended aeration activated sludge sewage treatment plants.

In extended aeration sewage treatment plants, effluent is passed into an aeration compartment where it is circulated and oxidized for a period to permit its digestion to a stable, safe form by aerobic bacteria and microbes, this step being essential before the effluent can be passed to open sewers or rivers.

This invention is an extended aeration activated sludge sewage treatment plant comprising a primary aeration compartment with which an inlet for raw effluent connects, diffuser means for circulating and oxidizing liquid in the compartment, a settling compartment, first means for passing liquid from the primary aeration compartment to the settling compartment, an outlet pipe whereby liquid may leave the settling compartment, a secondary aeration compartment in communication with the bottom of the settling chamber, diffuser means for circulating liquid in the secondary aeration compartment to draw deposited solid or sludge from the settling chamber into the aeration compartment, and means for transferring sludge from the secondary to the primary aeration compartment.

Said diffuser means may comprise perforated tubes through which compressed air may be passed.

The perforated tubes may be bound with, for example, plastic cord to reduce the size of air bubbles.

The means for passing liquid from the primary aeration compartment to the settling compartment may comprise either a weir or an air lift pump.

An embodiment of the present invention will now be described, by way of example, with reference to the accompanying drawing which is a diagrammatic sectional elevation of a sewage treatment plant according to the present invention.

Referring now to the drawing, an extended aeration sewage treatment plant 10 consists of three successive compartments 11, 12 and 13. The first compartment 11 is a primary aeration compartment and is provided with diffusers 14 in the form of perforated pipes 14a bound with plastic cord 14b which, when compressed air is passed through them cause a circulation of the liquid and sludge in the compartment 11 while simultaneously purifying the liquid by microbic activity. Into this compartment 11 the incoming effluent passes by means of an inlet pipe 15 and a boxed screen 16. The second compartment 12, the settling compartment, is connected to the primary aeration compartment 11 by means of a weir 17, a baffle plate 18 being provided at the lip of the weir to inhibit the passage of floating scum into the settling compartment. The settling compartment, in cross section, is in the form of an inverted triangle so that any solid material entering the secondary compartment collects as a sludge at the apex of the triangle. At the top of the settling compartment 12, again protected by a weir 20 and baffle arrangement 21 is an outlet pipe 22 by means of which purified liquid from the settling compartment 12 overflows and is passed to, for example, a stream. A baffle 24 is closely spaced from and combines with the weir 17 to form an inlet passageway to the settling compartment 12. If required, an upward flow pebble bed clarifier may be fitted to the settling chamber to remove solids from the purified liquid and prevent them passing out of the tank.

The third compartment 13 a secondary aeration compartment, communicates with the bottom of the settling compartment 12. Diffusers 25 are provided to cause a circulation anti-clockwise in the drawing in the third compartment that draws the sludge from the settling compartment. A small hole 26, protected by a special baffle 28, is provided in the dividing wall between the second and third compartments at the surface level, and this, because of the circulation in the compartment 13 causes a surface current from the second to the third compartment which keeps the second compartment free from scum. An air lift pump 27 is provided to draw liquid and sludge from the third compartment 13 and return it to the compartment 11, via the boxed screen 16 where it is intimately mixed with the incoming effluent, the resulting flow of liquid from the second to the third compartments assisting the removal of sludge from the second compartment. Triangular-shaped flow directing members 29A are located on the outer end walls of the primary and secondary aeration compartments and bevelled wall sections 29B are located at the intersection of the end and bottom walls of the primary and secondary compartments for directing flow within these compartments.

Rain sprays 31 may be provided to spray the surface of the first compartment.

An air compressor unit is provided in the housing 30 for supplying the diffusers, and a second stand-by compressor may also be provided.

Sewage treatment plants according to this invention ensure rapid removal of sludge from the settling compartment at relatively low velocities thus ensuring settling conditions are not disturbed and rapid return of reactivated sludge to the primary aeration compartment for immediate mixing with the incoming sewage in the screening box. Greater circulation in the aeration chamber is achieved by virtue of the central position of the settling chamber.

An air lift (not shown) pump may be provided between the first and second compartments instead of the weir 20 and baffle arrangement 21.

What is claimed is:

1. An extended aeration activated sludge sewage treatment plant including a treatment tank comprising spaced end walls, a pair of side walls longitudinally extending between said end walls and a bottom wall, spaced first and second partition walls extending across said tank between said side walls, said treatment tank divided by said partition walls into a primary aeration compartment formed between one of said end walls and the adjacent said first partition wall, a second aeration compartment formed between the other said end wall and said second partition wall adjacent thereto, and a settling compartment formed between said partition walls, said partition walls being disposed in downwardly converging relationship providing said settling compartment with a triangular cross sectional shape, said first partition wall contacting said bottom wall and having a concave shape at its lower end facing said settling compartment, said second partition wall having its lower end spaced above said bottom wall and from said first partition wall and forming therewith an outlet from said settling compartment into said secondary aeration compartment, an effluent inlet pipe discharging into the upper end of said primary aeration compartment, a boxed screen located within the upper end of said primary aeration compartment for passage therethrough of effluent from said inlet pipe, the upper end of said first partition wall forming a weir for the flow thereover of liquid and sludge from said primary aeration compartment into said settling compartment, a first baffle wall located within and extending across said primary aeration compartment and spaced closely from and parallel with the upper end of said first partition wall for inhibiting the passage of floating scum into said settling compartment, a first diffuser member disposed within said primary aeration compartment for delivering compressed air therein for circulating liquid and sludge, a triangular-shaped member secured to each of said end walls at a point intermediate the upper and lower ends thereof for directing the flow of liquid and sludge therein, a sloping wall member extending between each of said end walls and said bottom wall, and between said first partition wall and said bottom wall within said primary aeration compartment for assisting in the circulation of liquid and sludge within said compartments, a second baffle wall within said settling compartment and disposed in generally parallel relationship with and closely spaced from said first partition wall and forming therewith a passageway for the flow of liquid and sludge into said settling compartment, a liquid outlet pipe located in the upper end of said settling compartment adjacent said second baffle wall, a weir member extending upwardly from said outlet pipe and disposed in diverging relationship with said second baffle member and forming therewith an inlet passage to said outlet pipe, a third baffle wall within said settling compartment and closely spaced from and parallel to said weir member for directing purified liquid into said outlet pipe, a second diffuser member disposed within said secondary aeration compartment for discharging compressed air whereby the liquid and sludge therein is given a path of flow upwardly over the end wall and downwardly along said second partition wall toward said outlet from said settling compartment whereby the circulating flow causes a suction action for withdrawing sludge from said outlet, a fourth baffle wall in said secondary aeration compartment and closely spaced from and opposite the upper end of said second partition wall and forming therebetween a narrow passageway whereby the circulation of liquid and sludge within said secondary aeration compartment establishes a surface current in said settling compartment for removing scum from the liquid surface therein, an airlift pump located within said secondary aeration compartment, a conduit extending from said airlift pump to said primary aeration compartment and having the outlet therefrom discharging into said boxed screen for mixing the liquid and sludge removed from said secondary aeration compartment with the effluent from said inlet pipe as the two sources flow into said primary aeration compartment.

2. An extended aeration activated sludge sewage treatment plant, as set forth in claim 1, wherein said first and second diffuser members are comprised of perforated tubes through which compressed air is delivered to the compartments.

3. An extended aeration activated sludge sewage treatment plant, as set forth in claim 2, wherein said perforated tubes are bound with plastic cord.

4. An extended aeration activated sludge sewage treatment plant, as set forth in claim 1, wherein rain sprays are provided above said primary aeration compartment for spraying the surface of the liquid therein.

References Cited

UNITED STATES PATENTS

| | | | |
|---|---|---|---|
| 1,790,975 | 2/1931 | Dallas et al. | 210—220 |
| 2,555,201 | 5/1951 | Nordell | 261—121 |
| 2,574,685 | 11/1951 | Baxter et al. | 210—195 |
| 2,642,394 | 6/1953 | Paulette et al. | 210—195 |
| 2,987,186 | 6/1961 | Burgoon et al. | 210—7 |
| 3,195,727 | 7/1965 | Kibbee | 210—195 |
| 3,220,706 | 11/1965 | Valdespino | 210—221 |
| 3,355,023 | 11/1967 | Foster | 210—195 |

FOREIGN PATENTS

| | | |
|---|---|---|
| 562,376 | 10/1932 | Germany. |
| 886,585 | 1/1962 | Great Britain. |

REUBEN FRIEDMAN, *Primary Examiner.*

J. DE CESARE, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,400,822                                                      September 10, 1968

John Bell McKeown

It is certified that error appears in the above identified patent and that said Letters Patent are hereby corrected as shown below:

In the heading to the printed specification, line 5, "Macleod & Miller Engineers Limited" should read -- Macleod & Miller (Engineers) Limited --.

Signed and sealed this 17th day of March 1970.

(SEAL)
Attest:

Edward M. Fletcher, Jr.                            WILLIAM E. SCHUYLER, JR.
Attesting Officer                                          Commissioner of Patents